(12) United States Patent
Tsun (10) Patent No.: US 8,775,684 B1
(45) Date of Patent: Jul. 8, 2014

(54) CONTENT REQUEST OPTIMIZATION

(75) Inventor: Stephen Tsun, Cupertino, CA (US)

(73) Assignee: Google Inc., Mountain View, CA (US)

( * ) Notice: Subject to any disclaimer, the term of this patent is extended or adjusted under 35 U.S.C. 154(b) by 956 days.

(21) Appl. No.: 11/554,423

(22) Filed: Oct. 30, 2006

(51) Int. Cl.
*G06F 15/16* (2006.01)
*G06Q 30/00* (2012.01)

(52) U.S. Cl.
USPC .......................... 709/250; 709/208; 705/14.1

(58) Field of Classification Search
USPC ................................ 709/217–219, 250–253
See application file for complete search history.

(56) References Cited

U.S. PATENT DOCUMENTS

| | | | |
|---|---|---|---|
| 5,038,346 A * | 8/1991 | Courtois | 370/440 |
| 6,067,565 A | 5/2000 | Horvitz | |
| 6,725,421 B1 | 4/2004 | Boucher et al. | |
| 2001/0054001 A1 * | 12/2001 | Robinson | 705/14 |
| 2003/0093485 A1 * | 5/2003 | Dougall et al. | 709/208 |
| 2004/0093327 A1 | 5/2004 | Anderson et al. | |
| 2005/0222903 A1 * | 10/2005 | Buchheit et al. | 705/14 |
| 2008/0104194 A1 | 5/2008 | Tsun et al. | |

FOREIGN PATENT DOCUMENTS

WO WO02/15531 A1 2/2002

OTHER PUBLICATIONS

Becta Technical Papers "Web Caches" 2005 [online], [retrieved on Jan. 28, 2008]. Retrieved from the Internet <URL: http://foi.becta.org.uk/content_files/corporate/resources/technology_and_education_research/web_caches.pdf>.
Brattli, T. "Dynamic data using the DOM and Remote Scripting." dhtml central.com. Feb. 21, 2001 (4 pages).
Mohan, C. "Caching Technologies for Web Applications" [online]. Sep. 2001 (31 pages). [retrieved on Jan. 28, 2008]. Retrieved from the Internet: <URL: http://www.almaden.ibm.com/u/mohan/Caching_VLDB2001.pdf>.
"Nagle's algorithm." Wikipedia, the free encyclopedia [online], pp. 1-2 [retrieved on Jan. 7, 2009]. Retrieved from the Internet <http://en.wikipedia.org/wiki/Nagle's_algorithm>.
Nagle, J. "Congestion Control in IP/TCP Internetworks." Network Working Group [online]. Jan. 6, 1984, pp. 1-9. [retrieved on Jan. 7, 2009]. Retrieved from Internet <http://tools.ietf.org/rfc/rfc896.txt>.
Xie, X. et al., "Maximizing Information Throughout for Multimedia Browsing on Small Displays" In Multimedia and Expo, 2004, ICME '04. IEEE International Conference, vol. 27—Jun. 30, 2004, pp. 2143-2146 vol. 3, [online], [retrieved Jan. 28, 2008]. Retrieved from the Internet: <http://research.microsoft.com/asia/dload_files/group/ims/26.pdf>.
U.S. Appl. No. 11/554,419, filed Oct. 30, 2006.

* cited by examiner

*Primary Examiner* — Evans Desrosiers
(74) *Attorney, Agent, or Firm* — Fish & Richardson P.C.

(57) ABSTRACT

Content requests are stored in a data store, and a timer is configured to start in response to the storing of a first content request. The first content request and any additional content requests stored after the first content request are transmitted to a content provider in response to the expiration of the timer.

9 Claims, 7 Drawing Sheets

CONTENT REQUEST OPTIMIZATION

FIELD

This disclosure relates to information retrieval.

BACKGROUND

Content displayed on web pages can be generated by one or more content servers in response to content requests. The content requests can be generated during the rendering of a web page by a client device. If, however, the web page causes the client device to issue multiple content requests, excessive traffic can be generated between the client device and the content servers. For example, advertisements generated on a web page published by a publisher can be generated by an advertisement server. These advertisements are traditionally retrieved using a scripting language, such as JavaScript, and rendered in a browser on a client device. Each such location for an advertisement is typically referred to as an advertisement slot. The script that the publisher adds to a page for an advertisement slot to be retrieved is referred to as a snippet. Typically, the publisher is provided with a snippet generated by the advertisement server, which is then inserted into the web page. When a client browser visits a publisher's page, e.g., requests and receives the web page data for rendering, the client browser encounters the inserted snippets, which instruct the browser to transmit an advertisement request to the advertisement server. The advertisement server processes the snippet and returns to the client browser the advertisement content to be displayed on the publisher's page. The retrieved advertisement content is used to fill the advertisement slot.

On a page with a single advertisement slot, this works fairly well. However, with multiple advertisement slots on a webpage, there are often multiple snippets on a page that instantiate independently. As a result, each snippet attempts to retrieve advertisement content through its own advertisement request to the advertisement server. On a page with several advertisement slots, this may lead to excessive traffic to the advertisement server.

SUMMARY

Disclosed herein are systems and methods relating to the optimization of content requests. In one implementation, a data store is configured to store content requests. A timer is configured to start in response to the storing of a first content request. The browser on the client system is further configured to transmit the stored content requests in response to the expiration of the timer.

In one implementation, a buffer is similarly configured to buffer an advertisement request. A timer is initiated relative to the buffering of the advertisement request, and the timer is monitored. Additional advertisement requests are buffered until the expiration of the timer. The buffered requests are transmitted to the advertisement server at a time relative to the expiration of the timer.

The buffering of the content request can reduce data traffic between the content server and a computing device from which the content requests are issued. Accordingly, the content server can more efficiently serve the content requests.

DETAILED DESCRIPTION

Figure 1:
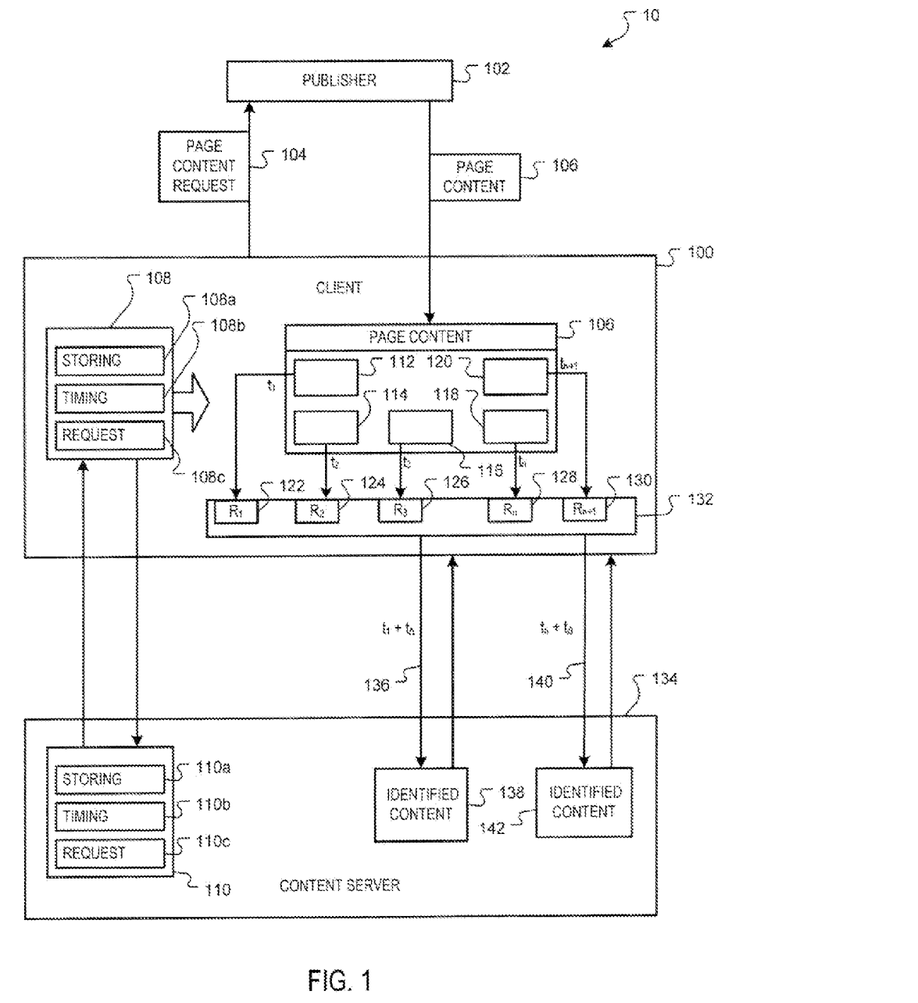
FIG. 1 is a block diagram of a system for requesting content from a source.

FIG. 1 is a block diagram of a system 10 for requesting content from a source, e.g., a content server. In one implementation, the content may include advertisements, and the content server can be an advertisement server. Different types of content can also be requested, e.g., weather, driving directions, trivia, etc.

The requesting device, in the implementation shown, is a client system 100 that is configured to visit web pages over a network, e.g., the Internet. The client system 100 can, for example, be a web browser, a computing or other device executing network navigation software, etc. The web address visited by the client system 100 can be resolved to identify a publisher 102, e.g., a server, hosting the corresponding web page. The client system 100 thus sends a web page content request 104 to the publisher 102 for the web page content 106. The publisher 102, in response to the request, provides the web page content 106 to the client system 100. The web page content 106 can include one or more content environments. In an implementation, the content environments are advertisement slots for advertisements to be served by an advertisement server. Other content environments can also be used.

The web page content 106 provided by the publisher 102 includes a reference to a set of instructions 108. In an implementation, the instructions 108 include storing instructions 108a, timing instructions 108b and request instructions 108c that are used to render and present the requested content, e.g., advertisements. In an implementation, the instructions 108 are provided by a content server 134, e.g., an advertisement server, and are stored at the client system 100, such as in a cache associated with a web browser. In an implementation, the client system 100 can determine for each subsequent access to the stored instructions 108 whether the stored instructions 108 are the most recent version. If the stored instructions 108 are not the most recent version, the client system 100 can request the most recent version of instructions 110, which can include storing instructions 110a, timing instructions 110b and request instructions 110c from the content server 134. Upon receiving the most recent version of the instructions 110, the client system 100 stores the most recent version of the instructions 110 as the stored instructions 108.

The web page content 106 can define content environments, e.g., content slots 112-120, that are configured to display content from the content server 134. In an implementation, the content slots 112-120 are advertisement slots. The instructions 108 generate content requests 122-130 that are issued to request content to fill the content slots 112 to 120. In an implementation, the requests 122 to 130 are stored in a data store 132, such as a buffer, and then sent to the content server 134 in one or more requests 136 and 140. For example, in one implementation, a timer is started in response to the storing of a first content request, e.g. content request 122, at a time $t_1$. The time may start substantially simultaneously at the time $t_1$, within a time frame slightly before or after the time $t_1$. In response to the expiration of a time period $t_A$, e.g., approximately at the time $t_1+t_A$, the content request 122 and any subsequent content requests received during the time period, e.g., content requests 124 and 126, are sent to the content server 134 as a combined request 136. The content server 134 processes the combined request 136 and returns identified content 138 to the client system 100. The identified content 138 is then displayed as part of the publisher's web page in the corresponding content slots, e.g., content slots 112, 114 and 116.

If a subsequent content request is received after the expiration of the timer, e.g., content request 128 is received at a time $t_n$, then a new timer is started in response. Likewise, in response to the expiration of the new timer, e.g., approximately at time $t_n+t_A$, another combined request 140 is sent to the content server 134. The content server 134 processes the combined request 138 and returns identified content 142 to the client system 100. The identified content 142 is then displayed as part of the publisher's web page in the corresponding content slots, e.g., content slots 118 and 120.

Different storing and timing schemes may be used to store content requests. In one implementation, a timing scheme provides that the storing of each content request starts a timer in response. Another timing scheme implementation provides that the storing of a content request only starts a responsive timer if there are no active timers. In another implementation, a content request process provides that the content requests are combined into a single request that is transmitted to the content server. These and other example implementations are illustrated in FIGS. 2-5 below, and each implementation can be used by the system 10 of FIG. 1.

Other implementations to store and send content requests can also be used. For example, content requests can be stored until the number of stored requests exceeds a threshold, e.g., three stored requests. In another implementation, a characteristic of the content request can be used to trigger the sending of stored content requests, e.g., encountering a request having a "high priority" characteristic can cause the sending of a combined request. In another implementation, the data store can be checked periodically, e.g., every 500 milliseconds, for stored requests and any stored requests can be sent as a combined request. In another implementation, requests may be stored and sent at a time relative to the beginning of the page rendering process, e.g., 500 milliseconds. Other storing and transmitting processes can also be used.

In one implementation, the instructions 108 that generate the content requests 122-130 to fill the content slots 112 to 120 are executed independently so that each content request is generated independently of a subsequent and/or previous content request. For example, the instructions that generate the first content request 120 may be executed without a priori information regarding the instructions that generate the remaining content requests 124-130. Likewise, the instructions that generate the second content request 122 may be executed without a priori information regarding the instructions that generate the remaining content requests 126-130, etc.

Figure 2:
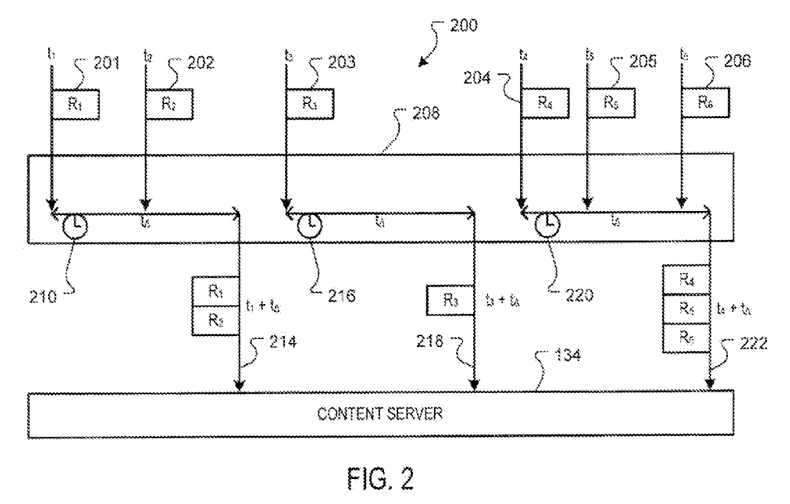
FIG. 2 is a timing diagram of an example content request process.

FIG. 2 is a timing diagram of an example content request process 200. In one implementation, this content request process can be used by the client system 100 to store and combine content requests, such as content requests 201-206. As the web page is rendered, the storing instructions 108a cause the content requests 201-206 to be stored in a data store 208, such as a buffer or a cache associated with a web browser, for example. When a content request is stored, the timing instructions 108b can start a timer in response if there is not an active timer. In response to the expiration of the timer, the request instructions 108c combines the stored content requests into a combined request that is transmitted to the content server 134.

For example, the client system 100, upon execution of the storing instructions 108a, stores a content request 201 at time $t_1$. The timing instructions 108b start a timer 210 at the storing of the content request 201 in response and approximately at the time $t_1$. Prior to the expiration of the timer 210, another content request 202 is stored in the data store 208. In response to the expiration of the timer 210, e.g., after a time period $t_A$, the request instructions 108c cause the client system 100 to transmit the stored content requests 201 and 202 to the content server 134 as a combined request 214.

Because the content request 201 and the content request 202 are transmitted to the content server 134 as the combined request 214, rather than two separate requests, the number of requests that are sent to the content server 134 are reduced. After the combined content request 214 is sent to the content server 134, the client system 100 monitors for the next content request that is stored, e.g., the content request 203. In response to the content request 203 being stored at time $t_3$, the client system 100 starts a timer 216 and repeats the storing process described with reference to the content request 201 until expiration of the timer 216. In response to the expiration of the timer 216, e.g., after a time period $t_A$, the stored content requests that were not transmitted at the expiration of the previous timer 210 are sent to the content server 134. For example, if no additional content requests are received prior to expiration of the timer 216, then the content request 203 is sent to the content server 134 as a combined request 218. In an implementation, if only a single content request is to be transmitted, e.g., the content request 203, then the combined request 218 may only comprise the single content request, e.g., the request 218 may be realized simply by transmitting the request 203.

This process repeats until all content requests are sent to the content server 134, e.g., the storing of the content request 204 at time $t_4$ starts a timer 220 approximately at the time $t_4$; content requests 205 and 206 are stored prior to expiration of the timer 220; and in response to the expiration of the timer 220 the content requests 204-206 are sent to the content server as a single request 222 approximately at the time $t_4+t_A$.

Although each timer 210, 216 and 220 in the example process 200 of FIG. 2 has identical time periods, e.g., $t_A$, different time periods can also be used. For example, a first time period can be selected to have a longest duration, and the second and subsequent time periods can be selected to have a shorter duration. The duration of the first time period can be selected with the expectation that most, if not all, content requests will be stored while the web page is rendered so that a single request for all content requests will be sent to the content server 134. Accordingly, second or subsequent requests will only be sent if rendering of the web page is delayed, e.g., the publisher 102 is experiencing heavy server traffic and is unable to process the web page content request 104 in a timely manner. In a variation of this implementation, subsequent content requests are not stored, but instead are sent to the content server upon processing. For example, the first time period can be set at 500 milliseconds, and the second and subsequent time periods, if any, can be set to 50 milliseconds.

Figure 3:
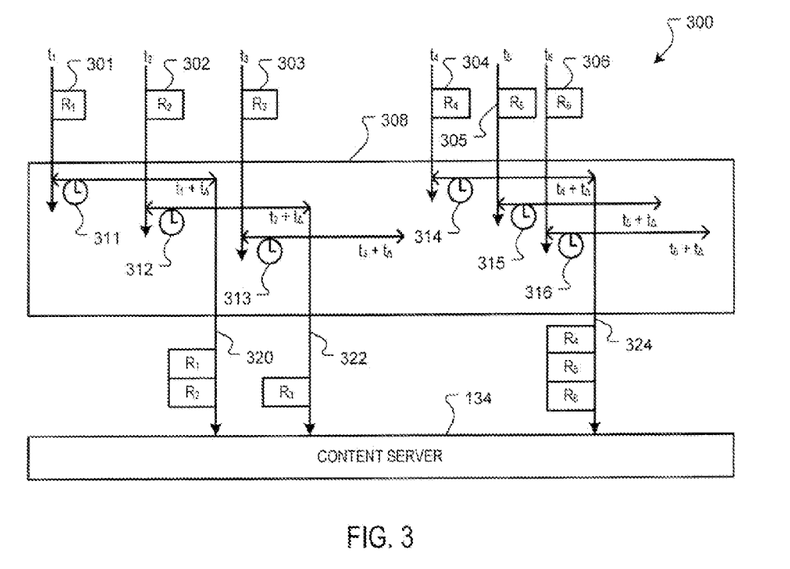
FIG. 3 is a timing diagram of another example content request process.

FIG. 3 is another timing diagram of an example content request process 300. In one implementation, this content request process can be used by the client system 100 to store and combine content requests such as content requests 301-306. As the web page is rendered, the storing instructions 108a cause the content requests 301-306 to be stored in a data store 308, such as a buffer or a cache associated with a web browser, for example. In response to each storing of a content request 301-306, the timing instructions 108b can start corresponding timers 311 to 316. At the end of each time period, the request instructions 108c cause the content requests that have been stored in the data store 308 and have not been previously transmitted to be transmitted to the content server as a single request.

For example, in response to storing the content request 301 at time $t_1$, a timer 311 is instantiated approximately at the time $t_1$. Prior to expiration of the timer 311, another content request 302 is stored at time $t_2$, and the corresponding timer 312 is started approximately at the time $t_2$. In response to the expiration of the timer 311 at the time $t_1+t_A$, the stored content requests 301 and 302 are transmitted to the content server 134 as a combined request 320 approximately at the time $t_1+t_{66}$.

In an implementation, content requests that were not sent in a previous transmission to the content server 134 are sent in response to the expiration of an active timer. For example, in response to the expiration of the timer 312 at time $t_2+t_A$, the content request 301 and the content request 302 are not transmitted to the content server 134, as they were transmitted at the expiration of the timer 311. Accordingly, only the content request 303 is transmitted to the content server 134 in the request 322. This process repeats until all content requests are sent to the content server 134, e.g., at the expiration of the timer 314, the content requests 304-306 are transmitted to the content server 134 in a combined request 324.

In the process 300 of FIG. 3, a timer begins in response to the storing of every content request. Thus it is possible that at the expiration of a timer, all stored content requests have already been transmitted to the content server 134. For example, at the expiration of the timer 313, the stored content requests 301, 302 and 303 have been transmitted to the content sever 134 by requests 320 and 322. Accordingly, in an implementation, the request instructions 108c cause the client system 100 to perform a no-op, e.g., no operation is performed, at the expiration of the timer 313. Likewise, no-ops are also performed at the expiration of the timers 315 and 316, as the stored content requests 301-306 have been previously transmitted to the content server 134 by the requests 320, 322 and 324.

In another implementation, the storing instructions 108a include instructions that cause the content requests to be deleted from storage after being transmitted in a combined request. Accordingly, the request instructions 108c can be configured to transmit content requests that are stored in the data store at the expiration of a timer, and if the data store is empty, then a no-op is performed.

Figure 4:
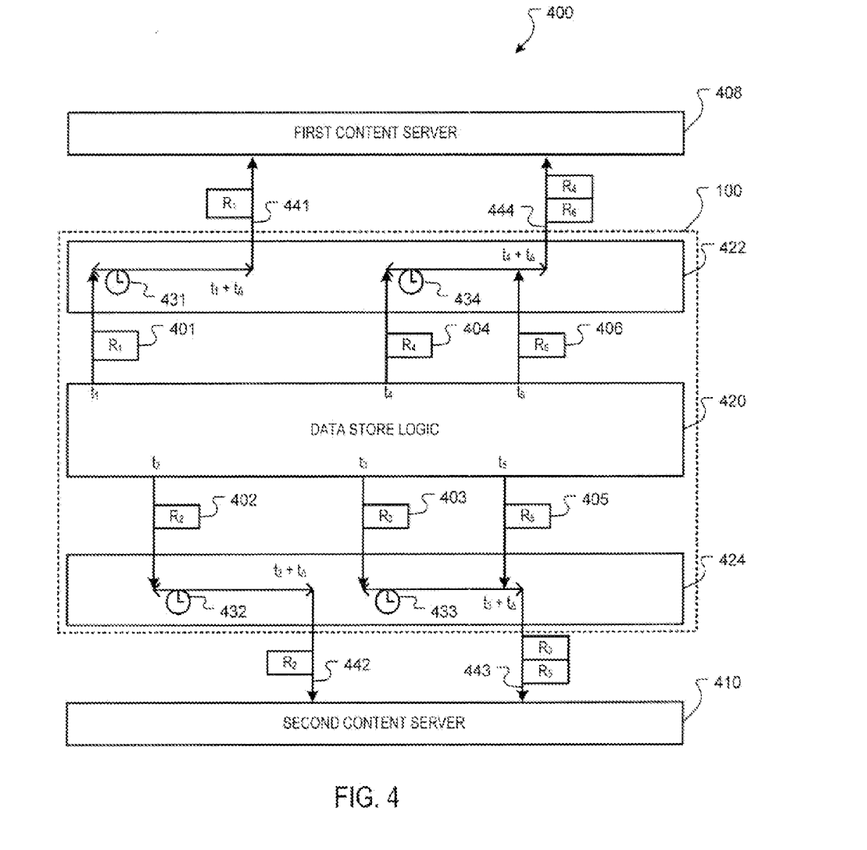
FIG. 4 is a timing diagram of an example content request process for use with two or more data stores.

FIG. 4 is a timing diagram of an example content request process 400 for use with two or more data stores. In one implementation, this content request process can be used by the client system 100 to store and combine content requests 401-406 that can be addressed to more than one content server, e.g., content servers 408 and 410. The storing instructions 108a can define data store logic 420 to determine the address of the content server to which a content request 401 is addressed. In an implementation, separate data stores are defined for each content server address, e.g., data stores 422 and 424. In an implementation, the data stores 422 and 424 can be implemented in the same memory device, e.g., a random access memory, a cache, etc., and the content requests are associated with a corresponding content server address by a data structure. Accordingly, the data stores 422 and 424 illustrate a storage abstraction that may be implemented in a single memory device. Other implementations may also be used.

The data store logic 420 determines an address associated with a content request, e.g., a content server address for either the content server 408 or 410, and stores the content request in a corresponding data store, e.g., data store 422 or 424. For example, the data store 422 is defined for content requests addressed to first content server 408, and the data store 424 is defined for content requests addressed to second content server 410. The data store logic 420 can determine that the content requests 401, 404, and 406 are, for example, addressed to the content server 408, and thus the content requests 401, 404, and 406 are stored in the data store 422. Likewise, the content requests 402, 403 and 405 are addressed to the second content server 410 and thus are stored in the data store 424.

In the example implementation of FIG. 4, the timing instructions 108b cause the client system 100 to start a timer relative to the storing of a content request in a data store. For example, a timer 431 is instantiated relative to the storing of the content request 401; likewise, timers 432, 433 and 434 are instantiated relative to the storing of the content requests 402, 403 and 404, respectively. As described above, other timer instantiations are possible.

In an implementation, the request instructions 108c handle the requests for each respective data store 422 and 424 in a similar manner as the process 200 of FIG. 2. For example, relative to the expiration of the timer 431, only the content request 401 is transmitted to the first content server 408 as a request 441; relative to the expiration of the timer 432, only the content request 402 is transmitted to the second content server 410 as a request 442; relative to the expiration of the timer 433, the content requests 403 and 405 are transmitted to the second content server 410 as a combined request 443; and relative to the expiration of the timer 434, the content requests 404 and 406 are transmitted to the first content server 408 as a combined request 444.

Figure 5:
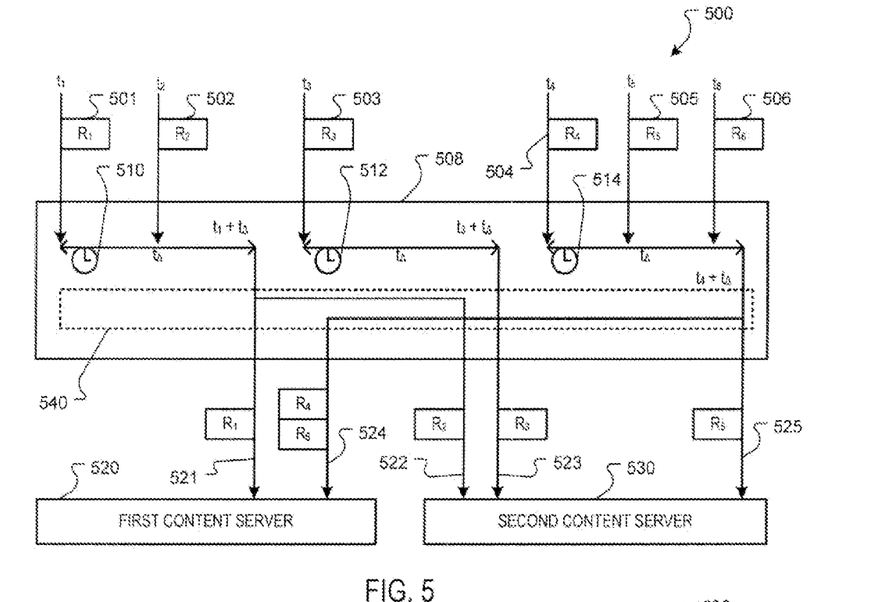
FIG. 5 is a timing diagram of an example content request process for use with two or more content servers.

FIG. 5 is another timing diagram of an example content request process 500 for use with two or more content servers. In one implementation, the content request process 500 can be used by the client system 100 to store and combine content requests that are addressed to different content servers, e.g., content servers 520 and 530. The timing instructions 108a and the storing instructions 108b handle the timing and requests in a manner similar to the process 200 of FIG. 2; however, the request instructions 108c define a request logic 540 that determines to which address a content request is addressed, and generates a combined request having one or more content requests to each corresponding content server 520 and 530.

For example, a content request 501 is stored at time $t_1$, and a timer 510 is started relative to the storing of the content request 501. Prior to the expiration of the timer 510, another content request 502 is stored in the data store 508. The first content request 501 is addressed to the first content server 520, and the second content request is addressed to the second content server 530. The request logic 540 determines that the first content request 501 is to be transmitted to the first content server 520, and that the second content request is to be transmitted to the second content server 530. Thus, relative to the expiration of the timer 510 at the time $t_1+t_\Delta$, a request 521 transmitting the content request 501 to the first content server 520 is transmitted, and a request 522 transmitting the content request 502 to the second content server 530 is transmitted.

Thereafter, another content request 503 addressed to the second content server 530 is received at time $t_3$ and a corresponding timer 512 is started relative to the time $t_3$. Relative to expiration of the timer 512 at the time $t_1+t_\Delta$, the content request 503 is sent to the second content server 530 as a request 523.

At the time $t_4$, another content request 504 addressed to the first content server 520 is received and a corresponding timer 514 is started relative to the time $t_4$. The additional content requests 505 and 506 respectively addressed to the second content server 530 and the first content server 520 are thereafter also received. Thus, relative to the expiration of the timer 514 at the time $t_4+t_\Delta$, the request logic 540 transmits a combined request 524 that includes the content requests 504 and 506 to the first content sever 520, and transmits a request 525 that includes the content request 506 to the second content server 530.

Figure 6:
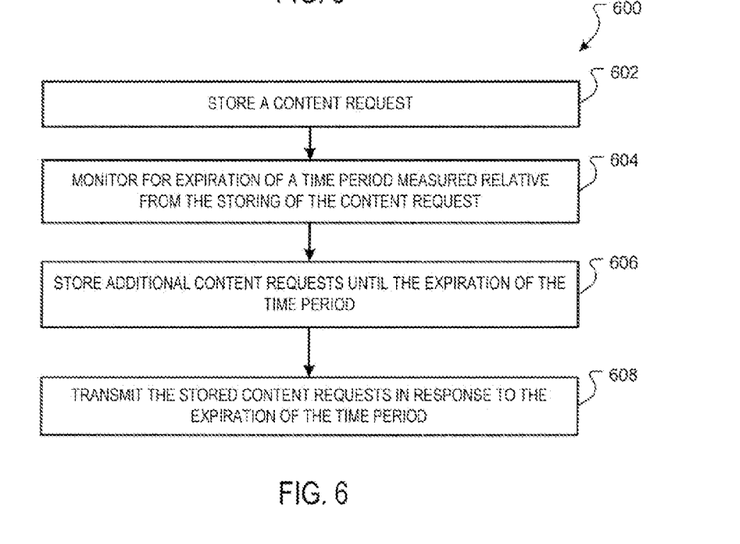
FIG. 6 is an example process for generating a combined content request and transmitting the combined content request to a content server.

FIG. 6 is an example process 600 for generating a combined content request and transmitting the combined content request to a content server. The example process 600 can, for example, be implemented in the client system 100 by execution of the instructions 108 on the client system 100.

Stage 602 stores a content request. For example, the client system 100, by executing the instructions 108, identifies the content requests that are present in the page content 106 of the publisher's web page retrieved from the publisher 102, and stores the content requests as the content requests are encountered.

Stage 604 monitors a trigger, e.g., for expiration of a time period measured relative from storing of the content request. For example, the client system 100, by executing the instructions 108, starts the timer 210 at the storing of the content request 201. The timer 210 is monitored for a period of $t\Delta$, measured from t1, which is when the content request 201 was stored.

Stage 606 stores additional content requests until the trigger is detected, e.g., the expiration of the time period. For example, the client system 100, by executing the instructions 108, stores the content request 202 received at the time t2 in the data store 208 before the expiration of the time period measured by timer 210.

Stage 608 transmits the stored content requests in response to the trigger (e.g., the expiration of the time period). For example, the client system 100, by executing the instructions 108, combines the content requests 201 and 202 in a combined content request 214 after the expiration of the time period $t_\Delta$, e.g., at time $t_1+t_\Delta$, to limit the number of content requests that the content server 134 must handle from a specific client. Thereafter, upon receiving the combined content request, the content server 134 processes the request and transmits the identified content back to the client system 100, which then displays the identified content.

Figure 7:
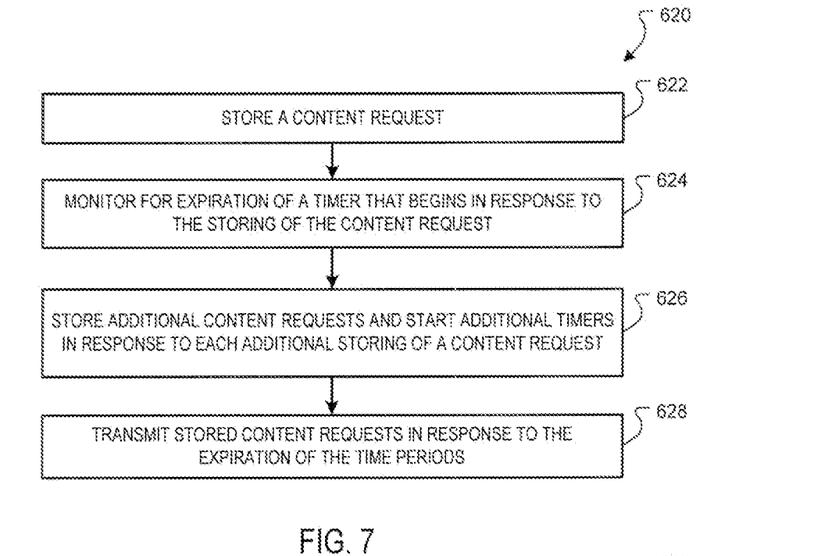
FIG. 7 is another example process for generating a combined content request and transmitting the combined content request to a content server.

FIG. 7 is another example process 620 for generating combined content request and transmitting the combined request to the content server. The example process 620 can, for example, be implemented in the client system 100 by execution of the instructions 108 on the client system 100.

Stage 622 stores a content request. For example, the client system 100, by executing the instructions 108, identifies the content requests that are present in the page content 106 of the publisher's web page retrieved from the publisher 102. Upon execution of the storing instructions 108, the client system 100 stores content requests as they are encountered.

Stage 624 monitors for expiration of a timer that begins in response to the storing of the content request. For example, the client system 100, by executing the instructions 108, starts the timer 311 when the storing of the content request 301 occurs, and monitors the timer for expiration.

Stage 626 stores additional content requests and starts additional timers in response to each additional storing of an additional content request. For example, the client system 100, by executing the instructions 108, starts the timers 311-316 at the respective storing of the content requests 301-306.

Stage 628 transmits the stored content requests in response to the expiration of the time periods. In one implementation, the process 620 can have multiple timers active at any time and the expiration of any timer will cause the stored content requests to be transmitted to one or more content server. For example, at the expiration of the timer 311 the stored content requests include the content request 301 and the content request 302. By executing the instructions 108, the client system 100 transmits both of those stored content requests as a combined request 320 to the content server 134.

Figure 8:
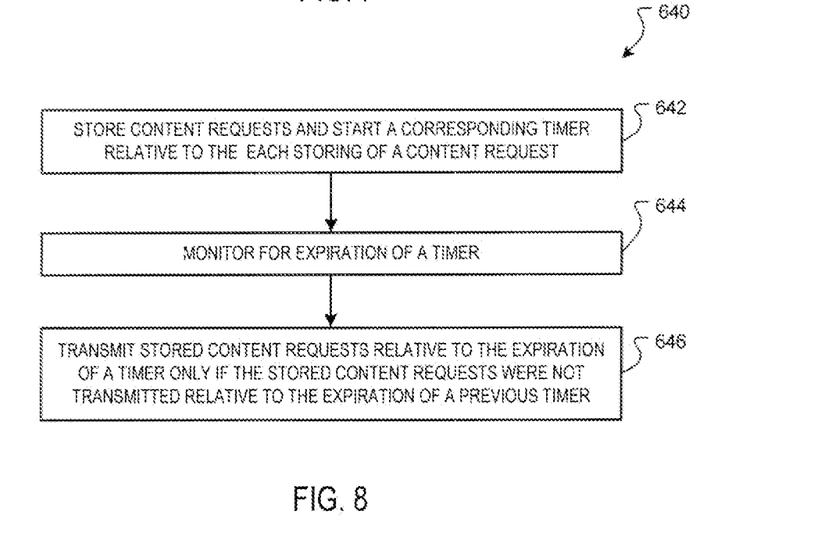
FIG. 8 is another example process for generating a combined content request and transmitting the combined content request to a content server.

FIG. 8 is another example process 640 for generating combined requests and transmitting the combined request to a content server. The example process 640 can, for example, be implemented in the client system 100 by execution of the instructions 108 on the client system 100.

Stage 642 stores a content request and starts a corresponding timer relative to the storing of each content request. For example, the client system 100, by executing the instructions 108, identifies the content requests that are present in the page content 106 of the publisher's web page retrieved from the publisher 102. Upon execution of the storing instructions 108a, the client system 100 stores content requests as they are encountered. For each content request stored, the client system 100 instantiates a corresponding timer as a result of executing the timing instructions 108b.

Stage 644 monitors for an expiration of a timer. For example, the client system 100, by executing the instructions 108, monitors for an expiration of any of the timers instantiated in stage 642.

Stage 646 transmits the stored content requests relative to the expiration of a timer only if the stored content requests were not transmitted relative to an expiration of a previous timer. For example, at the expiration of the timer 311 in FIG. 3, the stored content requests include the content request 301 and the content request 302, which have not been transmitted to the content server 134. Thus, the client system 100, by executing the instructions 108, transmits the stored content requests 301 and 302 to the content server 134 in the combined request 320. Thereafter, the content request 303 is stored. At the expiration of the timer 312, the content request 303 has not been transmitted to the content server 134. Thus the content request 303 is included in the request 322 and transmitted to the content server. The stored content requests 301 and 302, however, are not transmitted, as these content requests were transmitted in the combined content request 320.

Figure 9:
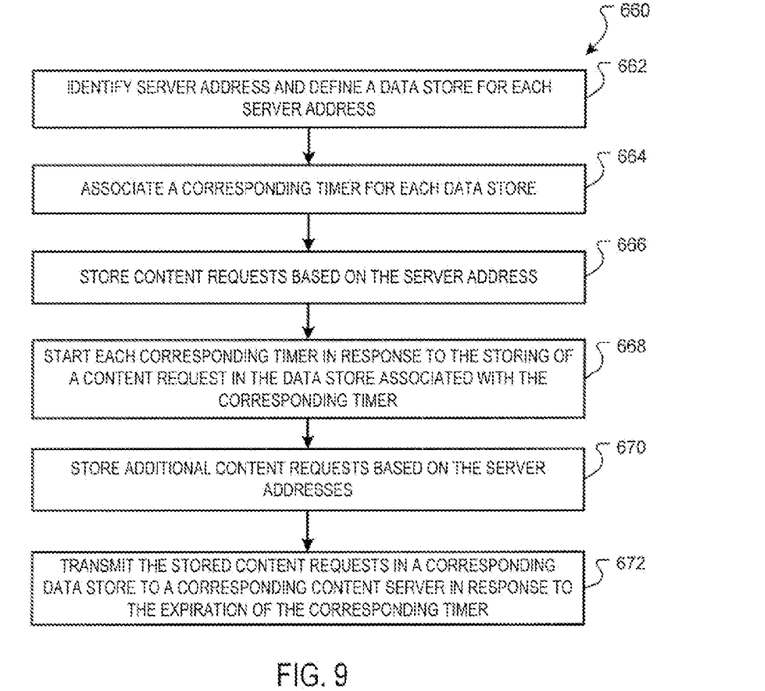
FIG. 9 is an example process for generating combined content requests that are addressed and transmitted to different content servers.

FIG. 9 is an example process 660 for generating combined content requests that are addressed and transmitted to different content servers. The example process 600 can, for example, be implemented in the client system 100 by execution of the instructions 108 on the client system 100.

Stage 662 identifies server addresses and defines a data store for each server address identified. For example, as shown in FIG. 4, the client system 100, by executing the instructions 108, can identify a first server address in the first content request 441 for the first content server 408 and define a first data store 422. Thereafter, the client system 100 can identify a second server address in the second content request 442 for the second content server 410 and define a second data store 424.

Stage 664 associates a corresponding timer for each separate data store. For example, the client system 100, by executing the instruction 108, can associate the timers 431 and 434 with the first data store 422, and associate the timers 432 and 433 with the second data store 424.

Stage 666 stores content requests based on the server addresses. For example, the client system 100, by executing the instruction 108, can determine that the content request 401 is addressed to the first content server 408, thus the content request 401 is stored in the data store 422. Likewise, the content request 402 is determined to be addressed to the second content server 410, and thus the content request 402 is stored in the data store 424.

Stage 668 starts each corresponding timer in response to the storing of a content request in the separate data store associated with the corresponding timer. For example, the client system 100, by executing the instruction 108, starts the timer 431 at the storing of the content request 401; at the storing of the content request 402, the timer 432 is started; at the storing of the content request 403, the timer 433 is started, and at the storing of the content request 404, the timer 434 is started.

Stage 670 stores additional content requests based on the server addresses. For example, the client system 100, by executing the instruction 108, can store the content request 405 in the second data store 424 based on the address of the second content server 410, and can store the content request 406 in the first data store 422 based on the address of the first content server 408.

Stage 672 transmits the stored content requests in a separate data store to the corresponding content server address in response to the expiration of the corresponding timer. For example, at the expiration of the timer 431, the content request 401 is transmitted to the content server 408 by the request 441; at the expiration of the timer 432, the content request 402 is transmitted to the second content server 410 by the request 442; at the expiration of the timer 433, the content requests 403 and 405 are transmitted to the second content server 410 by the combined request 443; and at the expiration of the timer 434, the content requests 404 and 406 are transmitted to the first content server 408 by the combined request 444.

Figure 10:
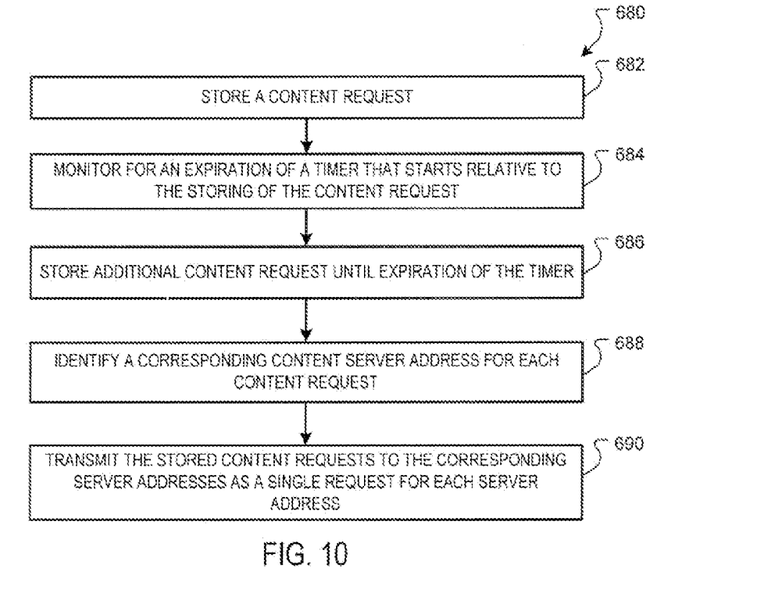
FIG. 10 is another example process for generating combined content requests and transmitting the combined content requests to different content servers.

FIG. 10 is another example process 680 for generating combined content requests and transmitting the combined requests to different content servers. The example process 680 can, for example, be implemented in the client system 100 by execution of the instructions 108 on the client system 100.

Stage 682 stores a content request. For example, the client system 100 identifies the content requests that are present in the page content 106 of the publisher's web page retrieved from the publisher 102. The client system 100, by executing the instructions 108, stores content requests in the data store 508 as they are encountered, such as the content request 501-506 of FIG. 5.

Stage 684 monitors for expiration of a timer that starts relative to the storing of the content request. For example, the client system 100, by executing the instructions 108, starts a timer 510 when the storing of the content request 501 occurs, and monitors the timer 501 for expiration.

Stage 686 stores additional content requests until the expiration of the timer. For example, the client system 100, by executing the instructions 108, stores the content request 502 in the data store 508. The content request 502 is stored before the expiration of the time period measured by timer 510.

Stage 688 identifies a corresponding content server address for each content request. For example, the client system 100, by executing the instructions 108, can identify a server address in the content requests 501, 504 and 506 that corresponds to the first content server 520, and can identify a server address in the content requests 502, 503 and 505 that corresponds to the second content server 530.

Stage 690 transmits the stored content requests to the corresponding content servers as a single request for each server address. For example, the request logic 540 of FIG. 5 can generate and transmit the request 521 for the content request 501 and the request 524 for the content request 504 and 506 to the first content server 520, and can generate and transmit the requests 522, 523 and 525 for the content requests 502, 503 and 505 for the second content server 530.

As described above, content requests are generated by the execution of corresponding request instructions, e.g., advertisement request scripts for an advertisement slot. In another implementation, the execution of content request instructions, e.g., one or more scripts, is delayed until the occurrence of a triggering event, e.g., the expiration of a timer that starts upon encountering the content request instructions, or the expiration of a timer that starts upon the beginning of rendering a web page, or some other triggering event. The storing of the content request instructions and/or the delaying of the execution of the content request instructions can be implemented according to the storing and delaying schemes as described above. For example, with respect to FIG. 2, the execution of corresponding content request instructions that generate the content requests 201 and 202 occurs at the time $t_1+t_A$; the execution of the corresponding content request instructions that generates the content requests 203 occurs at the time $t_3+t_A$; and the execution of the content request instructions that generate the content requests 204 and 205 occurs at the time $t_4+t_A$.

Figure 11:
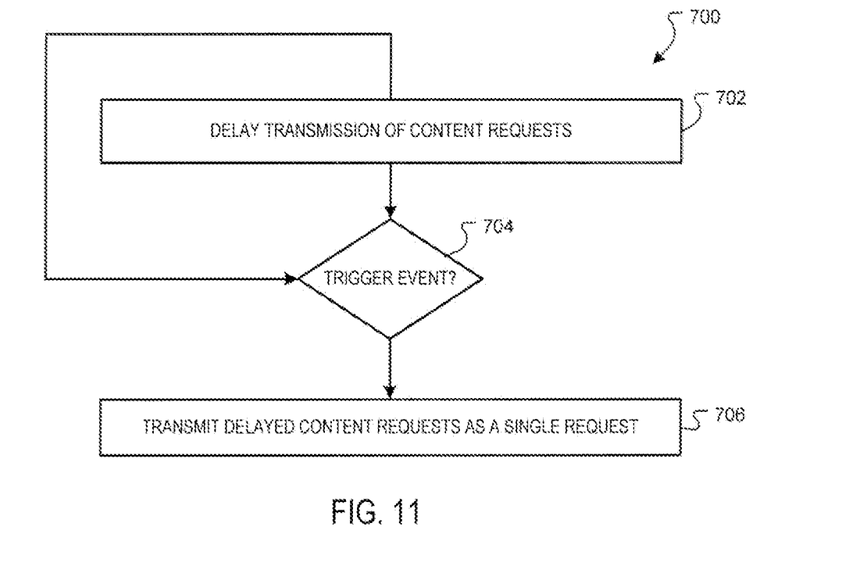
FIG. 11 is another example process for generating a combined content request and transmitting the combined content request to a content server.

FIG. 11 is another example process 700 for generating a combined content request and transmitting the combined content request to a content server. The example process 700 can, for example, be implemented in the client system 100 by execution of the instructions 108 on the client system 100.

Stage 702 delays transmission of content requests. For example, in one implementation, the client system 100, by executing the instructions 108, can identify content request instructions, e.g., advertisement request instructions, and delay execution of the content request instructions until the occurrence of a trigger event. In anther implementation, the client system 100, by executing the instructions 108, can execute the content request instructions and delay transmission of the content request.

Stage 704 monitors for a trigger event. For example, the client system 100, by executing the instructions 108, can monitor for one or more of the trigger events described above. In one implementation, the trigger event is independent of the instructions that generate a particular content request, e.g., a timer is started by a set of instructions that are separate from the instructions that are used to generate a particular content request.

If a trigger event does not occur, the process returns to stage 702. If, however, a trigger event does occur, then stage 706 transmits the delayed content requests as a single request. For example, in one implementation, the client system 100, by executing the instructions 108, can execute the request instructions, e.g., advertisement request instructions, and generate and transmit a combined content query that includes the request parameters for each of the content requests generated by the execution of the content request instructions. In anther implementation, the client system 100, by executing the instructions 108, can generate and transmit a combined content query that includes the request parameters for each of the stored content requests.

The implementations described herein can be used in different types of client devices, e.g., personal computers, mobile communication devices, set-top boxes, etc., or any other device that will generate content requests in response to rendering a publisher page. Additionally, the apparatus, methods, flow diagrams, and structure block diagrams described in this document may be implemented in computer processing systems including program code comprising program instructions that are executable by the computer processing system. Other implementations may also be used. Additionally, the flow diagrams and structure block diagrams described in this document, which describe particular methods and/or corresponding acts in support of steps and corresponding functions in support of disclosed structural means, may also be utilized to implement corresponding software structures and algorithms.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications, and variations to the examples without departing from the scope of the invention.

What is claimed is:

1. A client computer system, comprising:
a processor; and
a memory in data communication the processor, the memory storing a data store, the data store storing a web page including web page content that defines advertisement slots and includes references to instructions executable by the processor, the instructions including:
storing instructions configured to cause the processor to store content requests generated by the web page content for each advertisement slot;
timing instructions configured to cause the processor to start separate timers in response to storing the content requests generated by the web page content, each separate timer corresponding to only one of the stored content requests and being started in response to the storing of the only one content request to which it corresponds; and
request instructions configured to cause the processor to, at the expiration of each separate timer, transmit to a content server stored content requests that are stored in the data store prior to the expiration of the separate timer and that have not been previously transmitted to the content server in response to an expiration of any separate timer;
wherein:
the content requests are advertisement requests;
during execution of the instructions at least two timers overlap such that a first timer of the two timers is started before a second timer of the two timers is started, and the second timer is started before the first timer expires and the second timer expires after the first timer expires;
upon expiration of the first timer a content request for the first timer and a content request for the second timer are transmitted to the content server, and upon expiration of the second timer the content request for the first timer and the content request for the second timer are not sent to the content server; and
the request instructions are further configured to cause the processor to determine a corresponding content server address for each content request, and to transmit the stored content requests to the corresponding content server addresses as a single request for each content server address.

2. The system of claim 1, wherein:
the request instructions are further configured to cause the processor to transmit the stored content requests to the content server as a combined request.

3. The system of claim 1, wherein:
the instructions are Javascript compatible.

4. The system of claim 1, wherein:
the storing instructions are further configured to cause the processor to determine a content server address for each content request, and to define a separate data store in the memory device for each content server address;
the timing instructions are further configured to cause the processor to associate corresponding separate timers for each separate data store and start each corresponding separate timer in response to the storing of a content request in the separate data store associated with the corresponding separate timer; and
the request instructions are further configured to, at the expiration of each corresponding separate timer, cause the processor to transmit the stored content requests stored in the separate data store to which the separate timer corresponds to the content server addressed by the content server address to which the separate data store corresponds in response to the expiration of the corresponding timer.

5. The system of claim 1, further comprising:
a browser stored in the memory, and wherein the data store is a browser cache of the browser.

6. A computer-implemented method comprising:
rendering, at a client computer, a web page including web page content that defines advertisement slots and an advertisement request for each advertisement slot;
buffering the advertisement requests in a computer memory;
for each buffering of an advertisement request, starting in response to the buffering of the advertisement request a separate timer corresponding only to the advertisement request;
monitoring each separate timer for expiration of a time period measured relative to the buffering of the advertisement request to which the separate timer corresponds;
at the expiration of each separate timer, transmitting to an advertisement server buffered advertisement requests that are buffered prior to the expiration of the separate timer and that have not been previously transmitted to the advertisement server in response to an expiration of any separate timer; and
determining a corresponding advertisement server address for each advertisement request;
wherein:
transmitting the buffered advertisement requests comprises transmitted the buffered advertisement request to their corresponding advertisement server address as a single request for each advertisement server address;

at least two timers overlap such that a first timer of the two timers is started before a second timer of the two timers is started, and the second timer is started before the first timer expires and the second timer expires after the first timer expires; and upon expiration of the first timer an advertisement request for the first timer and an advertisement request for the second timer are transmitted to the advertisement server, and upon expiration of the second timer the advertisement request for the first timer and the advertisement request for the second timer are not sent to the advertisement server.

7. The method of claim 6, wherein:

transmitting the buffered advertisement requests comprises transmitting the buffered advertisement requests as a combined request.

8. A computer implemented method comprising:

receiving at a client device a web page including web page content that defines advertisement slots and includes references to instructions executable by the client device;

executing the instructions at the client device to cause the client device to perform the operations comprising:

storing content requests generated for each advertisement slot;

starting separate timers in response to the storing of the content requests, each separate timer corresponding to only one of the stored contents requests and being started in response to the storing of the only one content request to which it corresponds; and transmitting to a content server, at the expiration of each separate timer, stored content requests that are stored in the data store prior to the expiration of the separate timer and that have not been previously transmitted to the content server in response to the expiration of any of the separate timers;

wherein:

at least two timers overlap such that a first timer of the two timers is started before a second timer of the two timers is started, and the second timer is started before the first timer expires and the second timer expires after the first timer expires; and upon expiration of the first timer a content request for the first timer and a content request for the second timer are transmitted to the content server, and upon expiration of the second timer the content request for the first timer and the content request for the second timer are not sent to the content server;

transmitting the stored content requests comprises determining a corresponding content server address for each content request and transmitting the stored content requests to corresponding content server addresses as a combined request for each advertisement server address.

9. The method of claim 8, wherein:

transmitting the stored content requests comprises transmitting the stored content requests in a combined request.

\* \* \* \* \*

UNITED STATES PATENT AND TRADEMARK OFFICE
CERTIFICATE OF CORRECTION

| | | |
|---|---|---|
| PATENT NO. | : 8,775,684 B1 | Page 1 of 1 |
| APPLICATION NO. | : 11/554423 | |
| DATED | : July 8, 2014 | |
| INVENTOR(S) | : Tsun | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,089 days.

Signed and Sealed this
First Day of December, 2015

Michelle K. Lee
*Director of the United States Patent and Trademark Office*